Nov. 4, 1958  D. M. HAWLEY ET AL  2,859,109
FELTED PRODUCTS CONTAINING GLASS FILAMENTS
Filed Dec. 31, 1954  2 Sheets-Sheet 1

INVENTORS:
DON M. HAWLEY
JOHN C. WILLIAMS
BY Marshall, Johnston,
Cook & Root
ATT'YS Nov. 4, 1958 D. M. HAWLEY ET AL 2,859,109
FELTED PRODUCTS CONTAINING GLASS FILAMENTS
Filed Dec. 31, 1954 2 Sheets-Sheet 2

INVENTORS:
DON M. HAWLEY
JOHN C. WILLIAMS
BY Marshall, Johnston,
Cook & Root
ATT'YS

United States Patent Office 2,859,109
Patented Nov. 4, 1958

2,859,109

FELTED PRODUCTS CONTAINING GLASS FILAMENTS

Don M. Hawley, Geneva, and John C. Williams, St. Charles, Ill., assignors to Hawley Products Company, St. Charles, Ill., a corporation of Delaware Application December 31, 1954, Serial No. 479,057

9 Claims. (Cl. 92—3)

This invention relates to felted products containing glass filaments and more particularly to preforms and articles containing bundles of glass filaments.

The present application is directed toward subject matter in our application Serial No. 189,040, filed October 7, 1950, now U. S. Patent No. 2,702,241, which was required to be divided, and the subject matter of the present application is in part divided from our applications Serial Nos. 267,018, filed January 17, 1952; 310,373, filed September 18, 1952; and 468,563, filed November 12, 1954. The aforesaid applications are made a part hereof and the disclosures of said applications are incorporated herein by reference as fully as if they were set forth herein in their entireties.

It has long been recognized that glass filaments have certain properties which make them especially suitable for use in molded products in which it is desirable to have high flexural strengths and high impact strengths. Glass filaments are extremely strong when pulled longitudinally and they have exceptional resistance to heat and corrosive atmosphere.

The glass material ordinarily used for re-enforcing plastics and the like is made from glass filaments approximately 0.00038" in diameter. About 204 of such filaments are collected in a bundle. A commercial roving consists of about 60 such bundles. These rovings may be described generally as being thread-like in that they are long and flexible, very much like a thread, although thicker than the ordinary thread.

In commercial practice, it is conventional to process glass filaments in a dry way, for example, by air felting. Such air felted materials can be impregnated with resins and molded to produce various kinds of articles. It is also conventional in air felting processes to employ glass filaments in the form of cut rovings which usually contain a binder to hold the filaments together in the air. Dextrinized starch and similar materials are often employed as binders. Such rovings may also contain a substance which increases the affinity of the subsequently added impregnating resin for glass. An example of a coating material employed for this purpose is an intimate mixture of polyvinyl acetate and a Werner complex, as disclosed for instance in Steinman, U. S. Patent 2,611,718.

Despite the use of binders and coatings to increase the affinity for resins as heretofore employed in the art, wet processing of cut bundles of glass filaments are unsatisfactory due to the fact that such bundles would tend to come apart and form a cottony, unmanageable mass in an aqueous slurry. In our previously mentioned patent applications, we have described methods for wet processing cut bundles of glass filaments with and without the addition of hydratable fibers, such as cellulose or fine glass fibers. In carrying out said processes, we have been able to make new and improved fibrous preforms and articles containing cut bundles of glass filaments as hereinafter more fully described.

In accordance with our invention, the cut thread-like bundles of glass filaments are individually coated with an adherent water insoluble coating which keeps them from completley disintegrating into individual glass filaments in an aqueous slurry to form an unmanageable, cottony mass. The glass filaments initially employed are preferably cut rovings of commerce which have been cut to lengths within the range of about ⅛ inch to 8 inches, preferably ¾ to 2 inches. The rovings preferably contain a small amount of a Werner complex or other material which increases the adherence of resins to glass, it being understood, however, that the presence of such adherence-producing materials is unnecessary if the particular resin which is subsequently applied to the glass filaments adheres to the glass. In the processes described in the aforementioned patent applications, the thread like bundles of glass filaments are either individually precoated, preferably by precoating rovings or they are cut to the desired lengths and then coated with a resin in an aqueous slurry so that they will not fall apart into an unmanageable, cottony mass. The amount of the coating may vary somewhat depending upon the method used for applying the coating and also upon the particular resin employed. Where the resin is added to cut bundles of glass filaments or cut rovings in an aqueous slurry, the addition should be made contemporaneously with the addition of the cut bundles of glass filaments, the resin being added either before or simultaneously or immediately after the addition of the cut bundles of glass filaments to the aqueous slurry.

Where the resin is applied to the cut bundles of glass filaments in an aqueous slurry, the quantity of the resin used can be varied in order to alter the agglomerating characteristics of the resultant individually coated bundles of glass filaments. It is immaterial when cut rovings are used if some of the strands tend to separate from the rovings because, normally, the amount of resin applied as a coating to maintain the integrity of the bundles will be such that the glass filaments in the resultant slurry are present predominantly as coated bundles of glass filaments.

In general, when we apply the resin to the thread-like cut bundles of glass filaments in an aqueous slurry, we prefer to employ around 10% to 20% by weight of resin, based on the weight of the glass filaments in the bundles but lower quantities can be used. However, the quantities of resin are not ordinarily below about 5% and preferably do not exceed 50% by weight of the glass filaments.

The aqueous slurry of the coated bundles of glass filament material can be felted into sheets as in paper making or can be molded by accreting it from the aqueous slurry onto a porous former.

In accretion molding the fiber and water slurry is accreted onto a porous former according to well known methods which are described in detail in numerous patents, for example U. S. Patent 1,872,583 and U. S. Patent 1,952,168. Since the particular method of accretion molding is well known it is not deemed necessary to describe the method and apparatus in great detail here. The same applies to the formation of sheets on Fourdrinier and cylinder-type pare making machines. Where the aqueous slurry containing the coated bundles of glass filaments is used in making sheets on a Fourdrinier machine, it is preferably added to the headbox of the machine and the latter is preferably positioned so that the pulp furnished to the machine is fed onto the inclined wire at the extreme wet end of the machine. In the cylinder-type paper making or board-forming machine, the slurry is placed in the vat of the machine.

Felted or accreted sheets or articles can be made entirely from the cut bundles of glass filaments coated as previously described but we have found it to be desirable to incorporate into the felting composition a substantial quantity of fibers other than the cut glass filament bundles. The fibers which we prefer to incorporate can be described as water-hydratable fibers. The incorporation of these water-hydratable fibers has the advantage of imparting a substantial wet strength to the products made from the felting compositions so that they can be removed from a former without tearing. These additional water-hydratable fibers also impart a substantial dry strength to the felted product so that it can be impregnated with a resin and molded between molding dies without tearing the surface during the closing of the molding dies. We prefer to employ a weight ratio of cut bundles of glass filaments to water-hydratable fibers within the range of 9:1 to 1:9 and preferably within the range of 1:9 to 4:1. Where hydratable fibers are employed, however, the range can vary from 5% to 95% by weight of the hydratable fiber and from 95% to 5% by weight of the non-hydratable cut glass filament bundles. We preferably employ a mixture of fibers consisting of coated cut bundles of glass filaments and a water-hydratable fiber such as cellulose and/or fine glass fibers. Other fibers, such as asbestos, can also be incorporated in the aqueous slurry. Examples of fine water-hydratable fibers which can be employed are envelope clippings, refined rag, kraft, cotton linters, caroa and other cellulose fibers. Caroa is a Brazilian pineapple fiber and for the purpose of the invention is preferably subjected to a hammermill and bleaching operation before use. The cellulose fibers, and especially caroa fiber, have exceptional properties in distributing glass fibers to produce preforms and molded articles characterized by general homogeneous distribution of the coated cut bundles of glass filaments.

We have been able to obtain excellent results by employing a fine glass fiber material in conjunction with the cut fiber glass bundles. The glass material which we have found to be particularly effective has a diameter of 0.00003 inch and below. Other glass fibers which can be used are those having an average diameter from 0.00003 to 0.00006 inch and those having a diameter from 0.00006 to 0.0001 inch. These fine diameter glasses are available commercially and are used for insulation but are not recommended for plastic reinforcement due to their fragility and water solubility. They are of value for the purpose of the present invention because of the high wet strength which they confer on a freshly formed web or felt especially where the teachings of the invention are employed in paper making. Their use also makes it possible to make an article in which the fiber structure is entirely glass. As a result, many novel effects can be produced in the appearance of the article.

Where the water insoluble adherent coating material is applied to the cut bundles of glass filaments in an aqueous slurry rather than as a precoat, the mixing of the glass filaments and other fibers with a coating material, such as a resin, is preferably carried out in a breaker or beater capable of agitating and dispersing the fibers in the mixture. The consistency will vary depending upon the product which is to be made from the felting composition but is preferably within the range of 0.10% to 6% by weight of the total fibers, and in most cases, we prefer to use a consistency around 2% to 3% of the total fiber based on the weight of the water. The fibers must be beaten until the cut glass filaments are thoroughly distributed in the mixture. It is undesirable, however, to open up the fibers too much. An empirical test which we use to determine the amount of beating is to felt a flat pad 8 inches in diameter from 50 grams of the fiber. If the fiber is beaten too much the felted pad when dry will be fluffy and will be characterized by an uneven thickness or cross section of as much as ¾ inch. Where the proper amount of beating has been effected the cross section will not average more than ¼ to ½ inch. In general, beating the cut glass filaments from ½ minute to 2 minutes is sufficient for the purpose of the invention. The cellulose may take longer opening or beating.

The product which is obtained by felting an article out of the felting bath is referred to herein as a "preform." This preform may be a sheet or a contoured article. For some purposes the preform may be used as such. However, it is usually desirable to impregnate it with a resin such as, for example, a polyester resin and then to mold the product between dies in a suitable press at temperatures and for a period of time sufficiently long to cure the impregnating resin. The quantity of the impregnating resin may vary but good results are obtained by employing a weight ratio of approximately ⅓ to 2 parts of resin to 1 part of preform. The impregnation of a preform with a resin is not novel per se and has been used heretofore in making articles from air felted glass fibers. It should be noted, however, that when preforms are made by wet processing methods as described herein they readily absorb the resin and the final product has good physical characteristics. If polyester resins are employed the temperature in the press may vary within the range of 220° F. to 270° F. A period of about 2 to 5 minutes at these temperatures is usually sufficient to cure the resin. The pressure can be anywhere from 0 to 2000 pounds per square inch and upwards. In low pressure molding operations the pressure required to close the press will usually not exceed 200 pounds per square inch. In order to produce a product high in glass fiber and low in resin (e. g., 25% resin), pressures from 1000 to 2000 pounds per square inch and even higher pressures can be employed.

In the accompanying drawings which are used to illustrate the invention,

Figure 1:
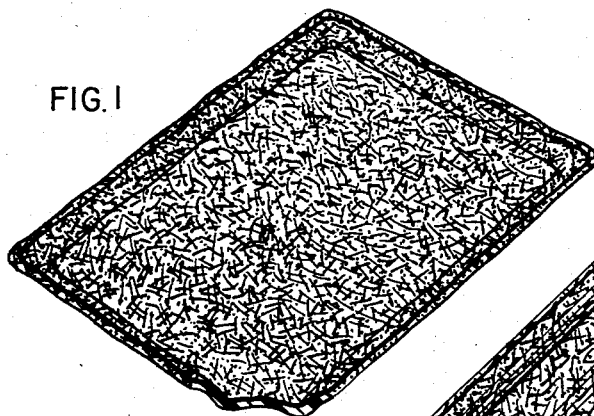
Fig. 1 represents a preform of a tray made in accordance with the invention.

The invention will be further illustrated but is not limited by the following examples in which the quantities are stated in parts by weight unless otherwise indicated.

Example I

A slurry is prepared consisting of ⅓ precoated cut bundles of glass filaments, ⅓ ground wood, ⅓ northern kraft. This slurry is useful in the manufacture of accreted fibrous products which are first prepared as preforms and then impregnated with a resin, then molded to produce a finished article. This process can also be used in the manufacture of a sheet material. The quantity of the coating substance should be sufficient to keep the glass filaments from falling apart into an unmanageable, cottony mass in an aqueous slurry but insufficient to completely destroy the flexibility of the coated bundles of glass filaments.

Example II

A composition containing coated bundles of glass filaments, as well as water-hydratable fibers, including water-hydratable glass fibers, is as follows:

⅓ coated bundles of cut glass filaments
⅓ northern kraft
⅙ ground wood pulp
⅙ water dispersible glass fibers It will be observed that the glass filaments are present predominantly as coated bundles of glass filaments. The water-hydratable fibers including the fine glass fibers assist in binding the other fibers together. At the same time, the kind and nature of the water-hydratable fibers is not such as to produce an unmanageable, cottony mass in an aqueous slurry.

Sheets and contoured articles can be prepared from an aqueous slurry of the above mentioned composition and felted therefrom at consistencies of 1/10 to 6%, preferably around 2% to 3%.

The composition above described can also be felted as wet lap and then redispersed in water to a consistency suitable for forming a sheet or a contoured article.

Example III

The following ingredients were dispersed in 2 gallons of water at 120° F. in the order given:

10 grams caroa fiber
20 grans polyester resin (Laminac flexible polyester PDL 7–663 catalyzed with 1% benzoyl peroxide)
40 grams ½ inch cut glass fiber roving A heavy agglomeration of the glass fibers was obtained. The mixture was agitated and the water temperature was brought to 180° F. and the agitation continued until the fiber was no longer sticky, indicating that the resin had been cured.

A preform felted from this bath contains a very heavy agglomeration of glass fibers and is suitable for impregnation with a thermosetting resin such as a poly ester resin followed by molding.

Example IV

To 2 gallons of water at a temperature of 120° F. there were added the following ingredients in the order named:

10 grams caroa fiber
40 grams ½ inch cut glass fiber roving, and after ½ minute of strong agitation
10 grams of the resin described in Example III Medium agglomeration of the glass fiber was observed. The water temperature was brought to 180° F. and agitation was continued until the fiber was no longer sticky.

A preform felted from this composition is suitable for further impregnation with a resin followed by molding.

Example V

To 2 gallons of water at 120° F. there were added in the order named:

10 grams caroa fiber
40 grams ½ inch cut glass roving, and after ½ minute agitation
5 grams resin of the type described in Example III The tendency for the glass to agglomerate was very slight. The water temperature was brought to 180° F. and the mixture was agitated until the fiber was no longer sticky.

Preforms felted or accreted from this composition are suitable for impregnation with thermosetting resins followed by molding.

Example VI

To 2 gallons of water at 120° F. there were added in the order named:

5 grams caroa fiber
45 grams glass fiber roving, and after ½ minute agitation
5 grams of resin of the type described in Example III The water temperature was brought to 180° F. and the mixture was agitated until the fiber was no longer sticky, indicating that the resin had been substantially cured. This felting composition is suitable for making preforms by felting them in sheets or accreting them on contoured forms. Such preforms are easily impregnated with polyester resins and the impregnated products are suitable for molding. The preform described in Example VI is softer and more easily impregnated than that described in Example V.

Example VII

The procedure described in Example VI was repeated using 2 minute agitation of the fiber. This allowed further opening of the glass fiber and it was observed that the packing density was being lost. Samples of the composition were felted and it was found that they were becoming lumpy.

Examples III to VII show that the agglomeration of the glass can be controlled by controlling the quantity of the resin added to the bath. This is important in making manageable felts, decorative effects and in producing products having a desired impact strength. In Example III agglomeration is accentuated by using a large amount of resin which contacts the glass immediately on its entry into the water. In the other Examples III to VI the glass was allowed to open or separate before being frozen in position by the resin. Example VII results in too much separation of the glass filaments from the bundles to make a good pulp molded preform but the product can be used in paper machine operation. In all of these examples when the glass fibers in the preforms are pressed at the end the fibers do not fan out into filament as is the case with unprotected glass fibers. The first sign of over-separation of the glass is the production of a very thick preform which in this series would be at least ¾ inch for a 50 gram sample of fiber made into an 8 inch diameter pad. Even the lightest resin treatment, as in Example VI, permanently restrained this.

The strength of the freshly felted and blanketed 8 inch diameter pad was measured by pulling it apart with a standardized apparatus having a pair of 3 inch clamps which grip tthe pad leaving a 6 inch space between the clamps. A breaking pull is exerted on the clamps and is measured in terms of the pounds necessary to pull the pad apart. We have found that a breaking strength of 3 pounds means that the felted pad is strong enough to be removed intact from the felter. A strength of 6 to 8 pounds means that die drying or molding between a pair of heated dies can be successfully carried out.

Felting compositions were also made containing 100% fiber glass 1 inch cut roving, but these were found to have a very low wet strength. Felting compositions were made containing a 100% refined caroa fiber, but these were found to have a very low impact strength when impregnated with a resin and molded.

Example VIII 3 pounds of refined caroa fiber were opened in 180 gallons of water at 120° F. and 4 pounds of Selectron 5208 polyester resin were added to which had been previously added 150 grams of Selectron 5554 blue paste. This is a flexible variety of resin catalyzed with about 1% benzoyl peroxide. The blue paste is an oil soluble or dispersed color.

15 pounds of 1 inch cut glass fiber rovings were now added and the water brought to 180° F. and held there for 20 minutes until the fiber no longer felt sticky. The stock was dispersed in a felting tank at ½% consistency and felted according to the usual pulp molding technique.

Articles felted out of this felting composition were dried by drawing hot air through them and impregnated with Selectron 5003, a relatively rigid or non-flexible polyester resin, in proportions of 2 parts of resin to 1 part dry weight of fiber. The resultant impregnated articles were then molded at a pressure of 200 pounds per square inch at a temperature of 250° F. for 5 minutes. The molded product showed a flexural strength of 16,000 pounds per square inch and an impact strength of 30 notched Izod.

*Example IX*

The procedure was the same as in Example VIII except that Laminac PDL 7–6653 was used as the treating resin instead of Selectron 5208. After the stock had been in the felting tank two days, a test piece was made which showed an impact strength of 17.3 and a flexural strength of 27,600 pounds. After five days the impact strength was 18.1 and the flexural strength 25,300 pounds. The felted preforms were smooth and of good finish. The resin color goes entirely on the glass fiber, giving the final product an interesting pattern.

*Example X*

20 parts caroa fiber was opened in water under a high speed mixture at 120° F. To this were then added simultaneously 20 parts 1% benzoyl peroxide catalyzed Selectron 5003, colored red with an oil dispersed pigment and 80 parts ¾ inch cut glass roving with agitation in enough water to produce a 3% consistency (97 parts water, 3 parts fiber) and the temperature was held at 190° F. until the fibers were no longer tacky.

It was observed that for 2 minutes the colored resin was associated with both glass and caroa and then it went entirely on the glass. A tray preform was accreted from the resultant felting composition and oven dried.

Dispersion of the stock was excellent, and there was no tendency for the glass fibers to separate; the tiny filaments were encased in the sticky resin. As mixing was continued, agglomerates of approximately 3 glass fibers appeared and persisted. These produced a novel and decorative effect in the final piece. On drying, impregnating with 2 parts by weight of Selectron 5003 containing 1% benzoyl peroxide and molding at 200 pounds per square inch into a tray, the following properties were obtained: Flexural strength 20,000 p. s. i.; impact 16, notched Izod.

*Example XI*

The procedure of Example X was repeated giving the glass 45 minutes' agitation. On drying, impregnation and molding as described in Example X the impact was found to be 12 and the flexural strength 18,000 p. s. i. An examination of the stock showed very few free filaments.

*Example XII*

10 grams caroa fiber was opened in 2 gallons of water at 180° F., and 10 grams of catalyzed Selectron 5208 (a flexible type polyester) was added. Air was swept through the stock 40 grams ⅞ inch fiber glass was now added, and after 3 minutes' agitation the stock was felted. After drying, impregnation with 2 parts of Selectron 5003 per part of dry fiber, and molding at 200 p. s. i. the flexural was 25,000 p. s. i. and the impact 21.7. The flexible polyester gave less fiber agglomeration and a smoother felt.

*Example XIII*

Five grams of caroa fiber was opened in 2 gallons of water at 120° F. To this were added 45 grams of ½ inch cut fiber glass roving and at the same time 10 grams of a mixture consisting of 1 part American Cyanamid Melmac 2458 (50% solids) and 3 parts Rohm & Haas Duraplex C–55–A (70% solids). The mixture was agitated while heating to 200° F. and then stopped for a dwell for 2 hours at this temperature. The fibers were observed to keep their form without separation or agglomeration. A pad was then felted from this mixture and found to pull 3 pounds in the wet according to the procedure previously described. It was oven dried, impregnated (2 parts of resin per part of pad) with Laminac PDL 7–663 catalyzed with 1% benzoyl peroxide, and molded at 200 pounds per square inch. The flexural strength of the molded product was 9500 and the impact value was 10.

In this example the Duraplex resin is a drying alkyd resin made by cooking phthalic anhydride, glycerine and castor oil. The Melmac 2458 is a butylated melamine resin capable of setting the Duraplex alkyd resin.

*Example XIV*

Five grams of envelope clippings were opened in 2 gallons of water by beating for 15 minutes at 120° F. Then 45 grams of ½ inch cut fiber glass rovings and 5 grams of Selectron 5003 resin catalyzed with 1% benzoyl peroxide were added. Heating and agitation were continued until a temperature of 160° F. was reached. The pad was felted and observed to have the fiber bundles intact. The wet pull according to the procedure previously described equalled 4 pounds. After oven drying the pad was impregnated with Laminac PDL 7–663 as in Example XIII and molded at 200 pounds per square inch. The flexural strength of the molded product was 25,000 pounds per square inch and the impact strength 16.

*Example XV*

Thirty-five grams of northern kraft were opened by beating in 2 gallons of water at 120° F. Then grams of Selectron 5003 catalyzed with 1% benzoyl peroxide, 15 grams of 1½ inch cut fiber glass roving and 15 cc. of 3% hydrogen peroxide were then added. The temperature was raised to 160° F. and 25 grams of 50% polyvinyl acetate emulsion was added. The mixture was agitated and after 5 minutes the stock was chilled by dilution and 20 cc. of a 10% melamine wet strength resin were added. The stock was felted into a preform and the resultant preform was die dried in vented dies heated to 300° F. The flexural strength of the resultant product was 16,000 pounds per square inch and the impact value was 14, notched Izod.

In this example the hydrogen peroxide acts similarly to air in inhibiting or destroying the catalyst at the surface of the resin fiber composition. Other water soluble peroxides such as sodium peroxide and the inorganic per-compounds, including sodium persulfate, sodium perchlorate, sodium perborate, ammonium persulfate and potassium persulfate can be similarly employed.

*Example XVI*

Open 8 pounds of white kraft fiber at 120° F. in 300 gallons of water using a disc stirrer or other suitable mixing apparatus to a Williams freeness around 5 to 6 seconds. Add 50 pounds of cut glass filament rovings consisting of 25 pounds 1¼" cut rovings and 25 pounds ½" cut rovings. The cut rovings are Fiberglas of the type used for plastic molding which has a chromium complex, polyvinyl acetate surface treatment. At the same time add a resin made by mixing together 5½ pounds rigid polyester resin (IC 625), 2 pounds turquoise pigment ground in polyester (Glidden Turquoise), 60 grams of a composition consisting of 50% by weight benzoyl peroxide and 50% by weight tricresylphosphate (Luperco ATC), 30 grams cobalt dryer, consisting of cobalt naphthenate containing 6% by weight Co, 30 grams of a composition consisting of 50% by weight methylethylketone peroxide and 50% by weight dibutyl phthalate (Lupersol DDM) and 2 pounds methylethylketone.

Stir the mixture of cellulose, resin and cut rovings and heat to 180° F. Continue the heating until the resin has cured on the cut rovings which requires about 15 to 20 minutes.

Add to the resultant bath 1½ galons of a 10 aqueous hydrochloric acid solution of cationic melamine formaldehyde (Parez 607). This can be prepared in a standard 55 gallon drum by adding 16 inches of water heated to 120° F., then adding 2½ gallons of concentrated hydrochloric acid, thereafter adding 40 pounds of melamine formaldehyde resin (e. g., Parez 607) while mixing and finally filling the drum with water.

Add to the resultant batch a composition consisting of ¾ pound of turquoise pigment ground in polyester, 1.5 pounds of uncured, non-sticky, practically solid, high viscosity polyester (Vibrin 1055B), 1.5 pounds of liquid polyester of the impregnating type (Interchemical 625) and 18 grams of Luperco ATC.

Dilute the resultant batch with water to a felting consistency within the range of ¼% to 6% by weight of the total fibers, preferably around ¼% to ½% by weight of the total fibers, based on the weight of the water. This dilution reduces the temperature to around say 150° F.

Separately prepare the following composition: Open 9 pounds (on a dry basis) of wet lap rag in a laboratory breaker in 250 gallons of water at 150° F. to a Williams freeness of around 5 to 6 seconds. Add 36 pounds of fiber glass rovings cut to ½" lengths and continue opening in the breaker for 15 seconds. Then add a resinous composition consisting of 800 grams of titanium dioxide pigment polyester paste (Interchemical high hiding white), 1350 grams polyester resin (Interchemical No. 625), 50 grams Luperco ATC, 20 grams cobalt naphthenate containing 6% Co, 300 grams methylethylketone and 40 grams Lupersol DDM. Continue agitating the resultant mixture in the breaker for 30 seconds, heat to 200° F. and continue at this temperature for 20 minutes. Add ¼ of the resultant composition to the previously described batch and immediately felt the fibrous mixture by accretion on to a porous former having a contoured shape, as, for example, the shape of a chair body.

Dry the resultant preform in a circulating air dryer oven. A chair body preform having a wet weight of around 4 pounds will have a dry weight around 2 pounds.

Add to the preform 2½ pounds for every 2 pounds of dry weight catalyzed clear polyester resin (Interchemical 625, Rohm & Haas P–47, Laminac 4123 or Selectron 5003), and mold the resultant impregnated resin in a press at a temperature of 220° F. and 100 pounds per square inch pressure on the piece for 4 to 5 minutes.

The finished product is a two-toned product in which cut bundles of glass fibers 1¼ inches long and ½ inch long are colored turquoise, the cellulose is colored turquoise and bundles of glass fibers ½ inch long are colored white. All of the fibers are dispersed in a clear resin giving a very unusual and delicate shading effect.

*Example XVII*

The following example is given to illustrate the practice of the invention in making a sheet material and also in producing decorative effects in such a material.

50 parts by weight (on a dry basis) of bleached kraft pulp are opened in a large volume of water at 120° F. To the resultant dispersion there is added 5 parts by weight of a clear polyester resin (Laminac 4123) catalyzed with 2% by weight Luperco ATC, 1% by weight cobalt naphthenate containing 6% Co, and 1% Lupersol DDM and colored with an oil-dispersed green pigment.

50 parts by weight of ½" to ⅞" cut Fiberglas rovings surface treated with a chrome complex-polyvinyl acetate finish are added to the resultant mixture. The polyester resin coats the glass fiber rovings, leaving the cellulose substantially unaffected. The resultant mixture is heated to 160° F. and maintained at this temperature until the resin is changed from a fusible to an infusible state.

11 parts of a solution of cationic melamine formaldehyde prepared as described in Example XVI is then added, followed by the addition of 5 parts by weight of uncatalyzed polyester resin (Laminac 4123), and 10 parts of 50% by weight polyvinyl acetate emulsion (Carbide and Carbon WC–130).

The fiber suspension is diluted with water to a consistency of 0.2% by weight of fibers and the stock is felted on an Oliver board-forming machine to produce flat sheets which are dried flat in a gas-fired oven at 250° C.

The resultant sheets in which the fiber content is approximately 50% cellulose and 50% glass are suitable for use as such and can also be impregnated with polyester molding resins and molded to produce molded products having excellent physical characteristics.

*Example XVIII*

This example is given to illustrate the employment of the invention in the preparation of a contoured, die dried article.

A dispersion is prepared by opening 100 pounds northern kraft, 23 pounds envelope clippings, 29 pounds defiberized rag and 10 pounds shredded wood in 250 gallons of water at 120° F. to a Williams freeness of about 6 seconds.

A polyester resin is separately prepared by mixing ½ gallon of a commercial polyester resin (Interchemical 625) with 1% by weight of Lupersol DDM and ½% cobalt drier. The resin composition is then added to the cellulose dispersion, and, at the same time or shortly thereafter, 18 pounds of 2" Fiberglas cut rovings are added. The mixture is agitated in a breaker for 1 minute and heated to a temperature of 160° F. until the fusible polyester resin is substantially converted into an infusible resin.

There are then added to the resultant dispersion 4¾ gallons of the cationic melamine formaldehyde material described in Example I, 40 pounds of polyvinyl acetate, 7 pounds of corn starch and 1 quart of a 50% emulsion of petroleum wax (Alwax). The resultant mixture is felted on a contoured former to approximately the shape of a typewriter carrying case and the felted preform is die dried between heated foraminous dies at a temperature of approximately 450° F. and a pressure of 50 pounds per square inch for 3 minutes. A finished piece is obtained which is suitable for covering with cloth or other similar type of material. In a similar manner shells for luggage can be made.

It will be noted that this example also illustrates the use of a thermoplastic resin, namely polyvinyl acetate, as the second addition resin. Thermoplastic resins of this type are characterized by the fact that the ester groups are in side chains rather than the principal resin chain. The starch, although not a resin, is a substantially water insoluble material which improves the surface finish of the resultant product and its ability to receive an adhesive for the application of a covering material.

*Example XIX*

One pound ½" cut Fiberglas roving is precoated with ½ pound 25% by weight polyester resin catalyzed with 2% by weight of the resin of Luperco ATC dissolved in methylethylketone. This is picked apart into a fluffy mass, the solvent removed by blowing air through the mass at 120° F. and the resin cured by baking at 300° F. for 15 minutes. It is found that on agitation in water the strands will separate from the roving, but the filaments do not come apart from the strand under the usual agitation.

The precoated bundles of filaments prepared as above described are agitated in water with 1 pound beaten white kraft fiber, the temperature brought to 120° F. and 90 cc. of 10% by weight melamine wet strength resin solution of Example XVI added. Agitation is continued while a solution (A) having the composition 100 grams clear polyester resin (Interchemical 625)
50 grams pigmented polyester resin (Interchemical High Hiding White)
12 grams catalyst (Luperco ATC)
100 grams methylethylketone
20 grams finely divided silicon dioxide (Santocel) mixed with 100 grams of methylethylketone is added.

The mixture disperses easily under agitation.

Tray preforms are felted from the resultant mixture, dried and impregnated with 2½ pounds of catalyzed clear polyester resin (Interchemical 625, Rohm & Haas P–47, Laminac 4123 or Selectron 5003) for every 2 pounds (dry weight) of the preform. The impregnated preform is then molded in a press at a temperature of 200° F. and 100 pounds per square inch pressure exerted on the preform for 4 to 5 minutes.

This example illustrates the practice of the invention where the bundles of glass filaments are first precoated with a resin to prevent them from completely disintegrating into individual filaments in an aqueous slurry, then slurrying the precoated bundles in water, followed by the addition of a cationic agent and a fusible polyester resin binding agent.

*Example XX*

40 parts of refined rag and 10 parts of ½" cut Fiberglas roving pretreated with a Werner complex and polyvinyl acetate are opened in water at 2% consistency (2 parts of fiber per 100 parts of slurry) under good agitation for 20 minutes.

A resin composition is prepared by mixing 2.5 parts of a polyester resin (Interchemical 625 colored red) in 2.5 parts of methylethylketone with 2% by weight of the resin of a catalyst (Luperco ATC) and adding the mixture to the previously prepared slurry. After 2 minutes of mixing under agitation, 10 parts of a 10% aqueous hydrochloric acid solution of cationic melamine formaldehyde (Parez 607) are added to the slurry, followed by an addition of an equal amount of the above described red polyester resin. The first resin addition is observed to go on the glass while the second resin addition appears to be taken up mostly by the cellulose. The resultant mixture is felted into a sheet, dried at 300° F. and is observed to have a good appearance and an excellent strength.

*Example XXI*

30 parts of refined rag and 20 parts of ¼" cut Fiberglas roving pretreated with a Werner complex and polyvinyl acetate are opened under a high speed mixed at 120° F. for 20 minutes in the presence of water at about 2% consistency.

A resin composition consisting of 2.5 parts of clear polyester resin (Interchemical 625), 2.5 parts methylethylketone and 0.5 part red polyester paste, catalyzed with 2% by weight of the resin of Luperco ATC, is added to the previously prepared slurry and after 2 minutes mixing under agitation, 10 parts of a 10% by weight aqueous hydrochloric acid solution of cationic melamine formaldehyde (Parez 607) are added.

Thereafter, a second equal amount of the same polyester resin is added. The first resin addition adheres to the glass while the second resin addition, in a major proportion at least, adheres to the cellulose. This stock is felted into a sheet and dried at 300° F.

Examples XX and XXI illustrate the application of the invention in the formation of sheets. These examples also illustrate methods of making a dimensionally stable sheet or mat which is strengthened by the incorporation of resin and glass. The coated bundles of glass filaments in these sheets which are bonded into the cellulose structure act as re-enforcing rods improving tear resistance, reducing water or humidity swelling and increasing burst strength. Decorative effects are obtained by coloring the glass fiber and also by coloring the cellulose with the second resin addition after the addition of the cationic substance.

Figure 2:
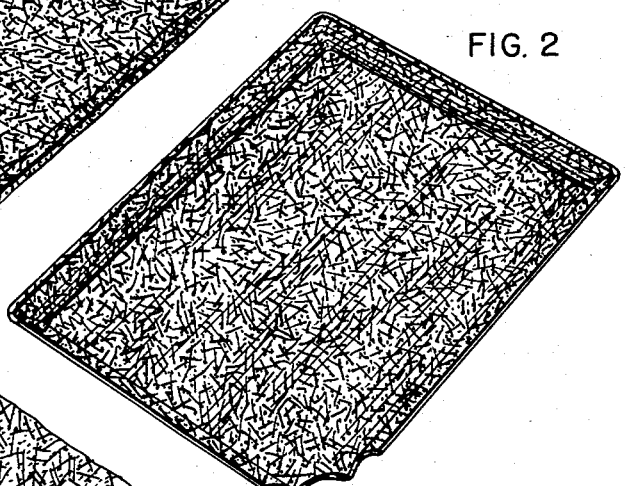
Fig. 2 represents a molded tray obtained by impregnating the preform of Fig. 1 with an impregnating resin such as a polyester resin, and then molding under heat and pressure as hereinafter more fully described.

The manufacture of a tray as described in Figs. 1 and 2 of drawings is generally illustrated by Example X. Fig. 1 illustrates the preform which is approximately ¼" in cross-sectional thickness and Fig. 2 illustrates the article obtained after the preform has been impregnated with a polyester resin and molded. The cross-sectional thickness of the molded article is about ⅛".

Figure 3:
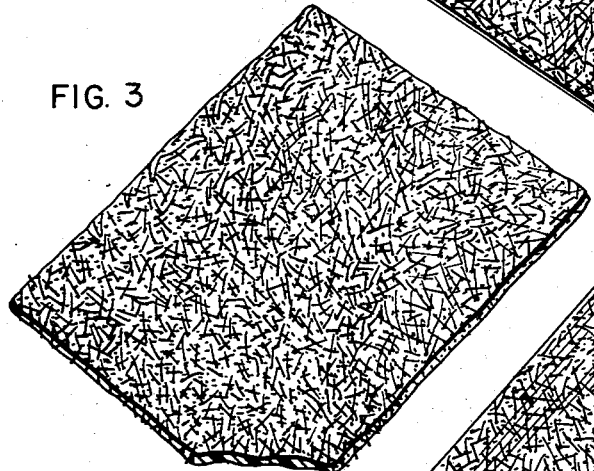
Fig. 3 illustrates a preformed sheet.
Figure 4:
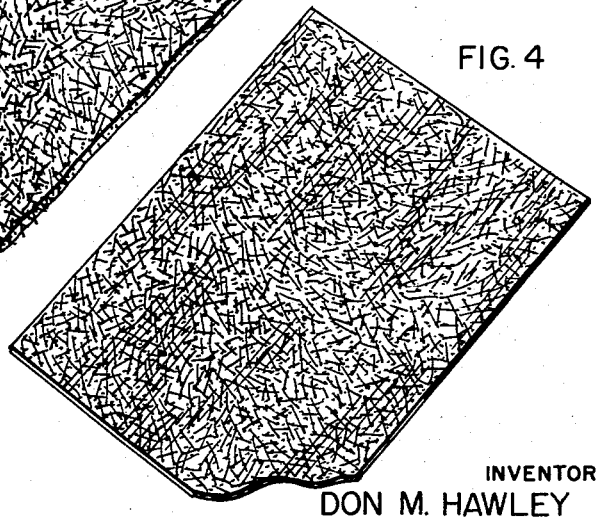
Fig. 4 illustrates the sheet of Fig. 3 after it has been impregnated with a resin such as a polyester resin, and molded under heat and pressure.

Figs. 3 and 4 illustrate, respectively, a preform sheet and a molded sheet. The preparation of a preform sheet of this type is described in Example XVII. The molded sheet is obtained by impregnating the preform with approximately twice its weight of a polyester molding resin and then subjecting to heat and pressure as described in Example X.

Figure 5:
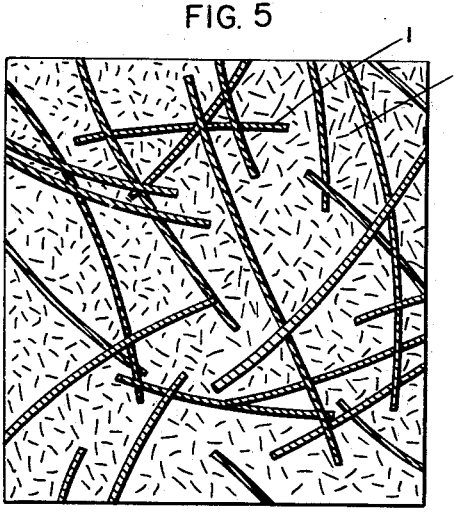
Fig. 5 illustrates an enlarged detailed section of a preform showing cut bundles of glass filaments which are colored green and dispersed in cellulose fibers having a white appearance.

Fig. 5 illustrates an enlarged section of a preform sheet obtained as described in Example XVII. In this sheet the cut bundles of glass filaments 1 are coated with a resin which is colored green. The cellulose 2 has a white appearance.

Figure 6:
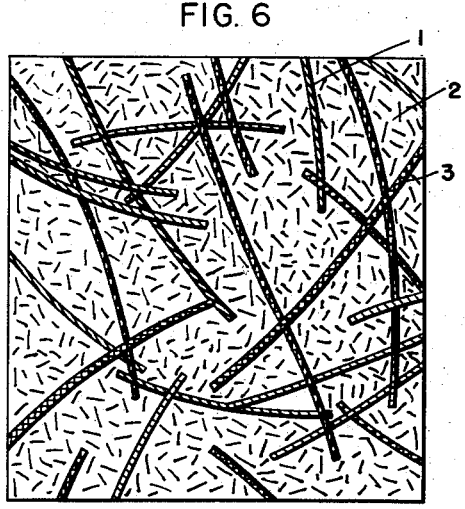
Fig. 6 illustrates an enlarged section of a preform similar to Fig. 5, except that cut bundles of glass filaments colored yellow are intermingled with the cut bundles of glass filaments colored green in a carrier of cellulose which has a white appearance.

In Fig. 6 the green colored cut bundles of glass filaments 1 are dispersed in the white cellulose 2 together with yellow colored cut bundles of glass filaments 3.

Figure 7:
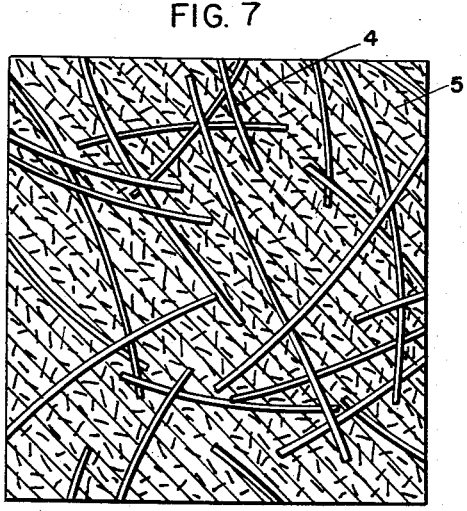
Fig. 7 illustrates an enlarged detailed section of a preform containing cut bundles of glass filaments coated with a clear resin intermingled with cellulose which has been colored green.

In Fig. 7 the cut bundles of glass filaments 4 are coated with a clear resin and the cellulose portion of the sheet 5 is colored green.

Figure 8:
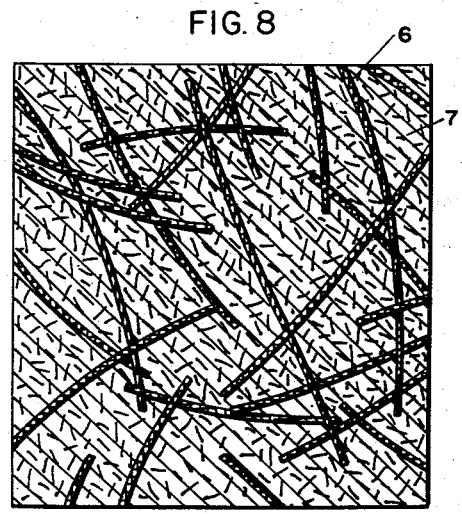
Fig. 8 illustrates an enlarged detailed section of a preform in which cut bundles of glass filaments colored yellow are dispersed and intermingled with cellulose fibers colored green.

In Fig. 8 the preform sheet is similar to that in Fig. 7 except that the cut bundles of glass filaments 6 are coated with a resin colored yellow and the cellulose 7 is colored green.

The general appearance of the preforms in Figs. 5 to 8 and the arrangement of the resin coated cut bundles of glass filaments with respect to the cellulose fibers is based upon actual articles and is characteristic of the results obtained in the practice of the invention. The arrangement of the coated bundles of cut glass filaments usually comprises three to six agglomerated cut bundles of filaments which cross to form triangles and present a novel and very unusual appearance.

The bundles of glass filaments may be of various sizes, that is, they may contain varying numbers of filaments. For example, a substantial number of bundles can exist in the preform, or a molded article made therefrom, as strands, each strand being composed of approximately sixty glass filaments 0.00038" in diameter.

It will be apparent from the examples that some variation is permissible in the manner in which the water insoluble coating is applied to the glass filament bundles and in the types of coatings that can be used. A single coating can be applied which can be applied either as a precoat by coating the glass filament rovings before they are cut and dispersed in an aqueous slurry or by coating the glass filament rovings and adding them to the aqueous slurry contemporaneously with the addition of the coating material. The coating material, such as a resin, can also be added to the aqueous slurry before the addition of the cut rovings.

The addition of the coating material to maintain the integrity of the glass filament bundles in an aqueous slurry is not to be confused with the addition of very small amounts, usually less than 1% by weight, of substances which are applied to increase the affinity of resins for glass, as, for example, stearato chromyl chloride, vinyl trichlorosilane and materials of the type disclosed in U. S. Patents 2,273,040, 2,359,858, 2,381,752, 2,401,645, 2,552,910 and 2,611,718. The practice of the present invention contemplates the employment of bundles of glass filaments previously treated with small amounts of substances which increase the affinity of the glass for resins. It is important for the purpose of the invention, however, to add to the bundles of glass filaments a water insoluble adherent coating material which will keep them from completely disintegrating into monofilaments in an aqueous slurry. The small amounts of substances, such as stearato chromyl chloride and polyvinyl acetate, currently employed in making glass rovings, have some effect in holding the glass filaments together in air but do not prevent disintegration of the bundles in an aqueous slurry.

A preferred practice of the invention is to make several resin additions, the first resin addition being a catalyzed, fusible liquid resin which is converted to a substantially infusible state in the aqueous slurry and serves to maintain the integrity of the glass filament bundles sufficiently to keep them from forming a cottony, unmanageable mass. The further resin additions which can be either thermoplastic or thermosetting resins, preferably the latter, serve to bind the coated glass filament bundles together with a resin-to-resin bond and increase the strength of the resultant preform as well as that of molded articles made therefrom. In making a second or third resin addition, it is also desirable where hydratable fibers are present in the aqueous slurry to add a substance which will increase the receptivity of the hydratable fiber for the resin.

As previously indicated, there are a large variety of substances which will enhance the receptivity of the hydratable fiber for the resin. The cationic melamine-aldehyde resins are preferably employed for this purpose because they are readily available commercially. The colloidal portion of these materials (i. e., the large portion of the molecule) carry a positive electrical charge when in aqueous solution. They may be prepared by dissolving ordinary melamine-aldehyde condensation products, such as methylol melamines, in acids such as hydrochloric acid, to form acidified or acid-type resin solutions having a glass electrode pH value within the range from about 0.5 to about 3.5 when measured at 15% solids, or pH values up to 4.5 when measured in more dilute solutions, followed by aging to the colloidal condition, as described in U. S. Patent 2,345,543.

The melamine formaldehyde resins are sometimes referred to as aminotriazine-aldehyde condensation products. Other methods of preparing such condensation products suitable for the practice of the invention are disclosed in U. S. Patents 2,485,079, 2,559,220, 2,577,767 and 2,529,856.

Urea-aldehyde resins suitable for the practice of the invention are disclosed in U. S. Patents 2,304,600, 2,456,191, 2,471,188, 2,476,065, 2,497,074, 2,517,128, 2,554,475, 2,556,898, 2,557,299, 2,625,524, 2,626,251 and 2,634,247.

Examples of other amide-aldehyde resins and amine-aldehyde resins which are suitable for the practice of the invention are those disclosed in U. S. Patents 2,497,073, 2,567,238, 2,526,638, 2,540,352, 2,548,513 and 2,567,238.

As an example of another class of compounds which increase the receptivity of cellulose and other hydratable fibers for resins in the second addition, there may be mentioned the alkyl ammonium acetates having the following general formula

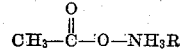

in which R is a hydrocarbon group containing 12 to 18 carbon atoms, for example, dodecyl, tetradecyl, hexadecyl, stearyl, oleyl, and mixtures thereof. These compounds are derived from primary amines, acetic acid and various fatty acids, including coconut fatty acids, hydrogenated tallow fatty acids and soya fatty acids. These substances also generally exhibit very strong cationic substantivity.

In addition to lauryl pyridinium chloride, other pyridinium, quinolinium and quaternary ammonium chlorides can be employed which have a long hydrocarbon chain containing 6 to 18 carbon atoms, including, for example, cetyl pyridinium chloride, stearyl pyridinium chloride, and the like.

The quantity of the substance added to increase the receptivity of the hydratable fiber to the resin can be relatively small and is preferably within the range of about 0.5% to 5% by weight of the hydratable fiber.

Where the resin is added to maintain the integrity of the glass filament bundles in the aqueous slurry, the first resin addition should preferably be a fusible resin which can be converted to an infusible state.

The fusible resin which is added to the fiber during the wet processing should preferably have a viscosity within the range of 100 centipoises to 20,000 centipoises. However, resins having a greater viscosity or even solid resins can be used by diluting them with a solvent such as acetone or methylethylketone. Very low viscosity resins can also be employed by heating the aqueous slurry to thicken the resins in situ. Heat can sometimes be used to thin high viscosity resins. Where a pigment is mixed with the resin we prefer to add it as a polyester pigment paste. Polyester pigment pastes usually contain 20% to 50% by weight pigment in polyester resin. We prefer to use about 1 part of pigment paste to 2 to 5 parts of resin. Hence, the pigment is about 2% to 25% by weight of the resin added in any given stage. The polyester containing a pigment can also be thinned with methylethylketone or acetone. The second resin addition can also be cured to a substantially infusible state in the aqueous slurry, and this has the advantage that it tends to drive the water out of the cellulose or other hydratable fiber, thereby decreasing the subsequent drying time. In ordinary practice, however, since a subsequent drying step is desirable, the second addition of resin, if of the type which can be cured to an infusible state, is cured in the subsequent drying step, that is, after the fibers have been felted into an article and the felted article has been removed from the aqueous slurry.

When certain types of resins are employed in the second addition, and particularly if they are added in the form of emulsions, it is not absolutely essential to add a substance which will increase the receptivity of the hydratable fiber to the resin. This is the case, for example, with thermoplastic resins such as polyvinyl acetate, polymethylacrylate, polyethylacrylate, polymethylmethacrylate and polyethylmethacrylate resins. Generally speaking, however, improved results are obtained by adding a substance which enhances the receptivity of the hydratable fiber for the resin.

The resins which are employed to coat the bundles of glass filaments are preferably of the thermosetting type and include resins such as those disclosed in U. S. Patents 2,318,959, 2,373,067, 2,381,969, 2,385,911, 2,397,240 and 2,401,549. The preferred resins are thermosetting resins in which ester groups are an integral part of the main chain or cross-linking chains as, for example, resins prepared by reacting two mols of ethylene glycol with one mol of phthalic anhydride and one mol of maleic anhydride for two to four hours at a temperature of 160° C. in an inert atmosphere such as nitrogen, carbon dioxide or illuminating gas, and then adding to the resultant product 10% to 40% monomeric styrene. Resins of the last mentioned type are usually referred to as polyester resins and, in general, are made by reacting a polyhydric alcohol with a polybasic acid or acid anhydride. Usually at least a portion of the acid component is maleic anhydride. The rigidity or flexibility of the resin can be varied by varying the type of polyalkylene glycol or by adding a portion of the dibasic acid as adipic acid or other higher molecular weight dicarboxy acid. Thus, by using ethylene glycol in the manner just described, a relatively rigid or non-flexible resin is produced. In order to produce flexible thermosetting polyester resins, higher molecular weight polyalkylene glycols, e. g., Polyethylene Glycol 200, Polyethylene Glycol 400, polyoxypropylene glycols and mixed polyethylene-polyoxypropylene glycols are substituted for the ethylene glycol or a portion of the dibasic acid used is adipic acid.

Solutions of these resins in monomeric vinyl compounds such as styrene are liquid and usually have an acid number around 10 to 50. When this liquid resin is catalyzed with a curing catalyst, a solid infusible resin is formed. Heating accelerates the formation of the infusible resin.

Suitable catalysts are the organic peroxides which are soluble in the hydrophobe or resin phase, for example, benzoyl peroxide, acetylbenzoyl peroxide, cumene hydroperoxide, para-tertiary butyl perbenzoate, methylethylketone peroxide, and other oil soluble oxygen-supplying catalysts.

Examples of other monomeric aryl compounds having an unsaturated side chain which can be employed in place of a part or all of the styrene are: vinyl toluenes, vinyl naphthalenes, vinyl ethyl benzenes, alpha methyl styrene, vinyl chlorobenzenes, vinyl xylenes, divinylbenzene, divinyltoluenes, divinyl naphthalenes, divinyl xylenes, divinyl ethyl benzenes, divinyl chlorobenzenes, divinyl-phenyl vinyl ethers and diallyl phthalate. Lower boiling monomers such as vinyl acetate usually are not satisfactory because the reaction which takes place when the resin is cured is very exothermic and the heat would drive off low boiling monomers.

Some thermosetting resins are compounded with driers such as lead and cobalt salts of 2-ethyl hexoic acid, oleic acid, naphthenic acids, and other carboxylic acids, and the thermosetting resins used in the practice of the invention can contain such driers. We have also obtained good results by adding the thermosetting resin to the fibers in the aqueous slurry without such driers.

Instead of employing a polyester resin, we can also use an epoxy resin. One type of an epoxy resin is made by reacting bis-phenol with a caustic alkali to convert it to a bis-phenylate, then condensing the resultant phenylate with epichlorhydrin. The resultant fusible material is hardened by reaction with a substance containing a reactive hydrogen atom which will react to open the epoxy ring. The hardening agent may also be a cross-linking agent, that is to say, a substance containing two reactive hydrogen atoms. Examples of such hardening agents are ethylenediamine, diethylene triamine, polyethylene imines, phenylenediamine, maleic anhydride, polyamide resins and Thiocol rubbers (reaction products of ethylene dichloride and sodium polysulfide). The bis-phenol can be replaced by glycerine or other polyhydroxy material.

Where several additions of resin are made, the quantity of resin added after the first addition is subject to considerable variation but is preferably 1% to 25% by weight of the total fibers dispersed in the aqueous slurry. The total resin added in the first and second additions, therefore, is preferably within the range of 6% to 50% by weight of the total fibers. The quantity of resin added in the first addition in such a case is usually within the range of 5% to 25% by weight, based on the dry weight of the cut bundles of glass filaments.

The second resin addition is preferably weakly catalyzed and is not cured until the article is felted and dried. This second addition functions as a binder for the felted article and makes it possible to produce much stronger preforms. This is especially desirable where the preform is contoured and it is desired to retain the preform shape approximately corresponding to the shape of the finished molded article. The resins used in the second addition can be the same as those employed in the first addition but in many cases it is desirable to use different resins in the second addition in order to obtain different properties in the final product. The resin employed in the second addition can also be a thermoplastic resin rather than a thermosetting resin. In the use of polyester resins for the second addition, the ordinary types give a rather sticky stock and a high viscosity or solid resin is preferably employed. These resins can be added in solutions of solvents such as methylethylketone in order to increase the ease of addition. They can also contain loading agents such as clay in order to render them less sticky.

The proportions of the hydratable fibers and non-hydratable fibers can be varied, depending upon the type of article which it is desired to make. For many purposes, as, for example, in making contoured preforms, we prefer to employ 5% to 35% by weight of glass fibers in the form of bundles of glass filaments, the remainder of the fibers being cellulose fibers. On the other hand, in making sheets we prefer to employ as much as 50% to 80% by weight of cut bundles of glass filaments, the remainder being hydratable fibers.

Novel and unusual decorative effects can be obtained by the practice of the invention because the non-hydratable bundles of glass filaments can be coated with a clear resin or the resinous coating can be colored white, blue, green, red, yellow or a variety of other colors. Similarly, the hydratable fiber can be present in the felted product with its natural appearance or in a colored state. Furthermore, if a final addition of colored resin-coated cut bundles of glass filaments is made to the aqueous slurry before felting, the colors used can be the same or different from those employed in coloring the bundles of glass filaments previously added and/or the hydratable fiber. One of our preferred procedures is to make three resin additions (1) to the bundles of glass filaments, either as a precoat or in the aqueous slurry, to prevent complete disintegration into individual filaments; (2) to the slurry as a binding agent; and (3) on glass filament bundles prepared in a separate batch. In this procedure we prefer to keep the same color in (1) and (2) and add the contrasting color as a colored resin coated fiber (3).

In the felted preforms and die dried products made therefrom, the hydratable fibers, such as cellulose, are intermingled with coated bundles of non-hydratable filaments, such as glass filaments, and the proportions of the hydratable and non-hydratable fibers can be varied within the previously described limits to produce varying effects.

In felted products which have subsequently been impregnated with a resin and molded between solid dies, additional novel decorative effects can be obtained due to the fact that the hydratable and non-hydratable fibers maintain substantially their original orientation but are now embedded in a body of resin which constitutes usually one-fifth to two times the weight of the total fibers. The impregnating resin can also be colored but more delicate and pleasing multicolored effects are usually obtained by employing a clear resin.

The term "hydratable fibers" refers to fibers that swell or hydrate in the presence of water and includes cellulose fibers and very fine glass fibers.

The term "fusible" is used herein to describe an uncured or incompletely cured resin (either solid or liquid) which has not been thermoset as distinguished from a cured resin which is infusible and does not soften or flow when heated.

The invention is hereby claimed as follows:

1. A felted article consisting essentially of individual cut flexible thread-like bundles of glass filaments ⅛ inch to 8 inches long intermingled with one another and dispersed with hydratable fibers, said bundles each being coated with about 5% to 50% by weight of a water insoluble adherent coating material, the quantity of said hydratable fibers being within the range of 5% to 95% by weight of the total fibers.

2. A felted article consisting essentially of intermingled cut bundles of glass filaments individually coated with a quantity of a substance which adheres to glass and is insoluble in water, said quantity being at least 10% but not substantially greater by weight than the weight of the glass filaments in said bundles and hydratable fibers intermingled with said cut glass bundles.

3. A felted article consisting essentially of intermingled cut bundles of glass filaments having an average length within the range of about 1/8" to about 8", said bundles being coated individually with a quantity of a substance which adheres to glass and is insoluble in water and intermingled with hydratable cellulose fibers, the quantity of said coating substance being at least 5% by weight and not substantially greater by weight than the weight of the glass filaments in said bundles and the quantity of glass filaments being within the range of 5% to 35% by weight of the total glass filament and cellulose content.

4. A preform consisting essentially of intermingled cut thread-like bundles of glass fibers having an average length within the range of about 1/8 inch to about 8 inches coated with a resin in a substantially infusible state and distributed among finer hydratable fibers, the weight ratio of said bundles of glass fibers to said finer fibers being within the range of 1:9 to 9:1 and the quantity of said resin being about 5% to about 50% by weight of the total fibers.

5. A preform consisting essentially of intermingled cut thread-like bundles of glass fibers having an average length within the range of about 1/8 inch to about 8 inches coated with a resin in a substantially infusible state and distributed among finer hydratable fibers, the weight ratio of said bundles of glass fibers to said finer fibers being within the range of 1:9 to 4:1 and the quantity of said resin being about 5% to about 50% by weight of the total fibers.

6. A felted article consisting essentially of individual cut flexible thread-like bundles of glass filaments 1/8" to 8" long intermingled with one another and dispersed with cellulose fibers, said bundles each being coated with about 5 to 50% by weight of a water insoluble adherent coating material, the quantity of said cellulose fibers being within the range of 5% to 95% by weight of the total fibers.

7. A felted article consisting essentially of individual cut flexible thread-like bundles of glass filaments 1/8" to 8" long intermingled with one another and dispersed with cellulose fibers, said bundles each being coated with about 5% to 50% by weight of a polyester resin in a substantially infusible state, the quantity of said cellulose fibers being within the range of 5% to 95% by weight of the total fibers.

8. A molded article consisting essentially of a preform composed of cut thread-like bundles of glass filaments having an average length within the range of about 1/8" to about 8" coated with 5% to 50% by weight of a water insoluble resin and distributed among finer hydratable fibers, impregnated with a water insoluble resin which fills the spaces between said bundles of glass filaments and said finer hydratable fibers, the quantity of said hydratable fibers being within the range of 5% to 95% by weight of the total weight of the glass filaments and hydratable fibers, the quantity of the impregnating resin corresponding to 1/5 to 2 parts by weight of resin per part by weight of said preform.

9. A molded article as claimed in claim 8 wherein the resin coating the bundles of glass filaments and the impregnating resin are both polyester resins which have been converted to a substantially infusible state.

References Cited in the file of this patent

UNITED STATES PATENTS

| | | |
|---|---|---|
| 2,354,110 | Ford | July 18, 1944 |
| 2,477,555 | Roberts | July 26, 1949 |
| 2,563,289 | Steinman | Aug. 7, 1951 |
| 2,611,718 | Steinman | Sept. 23, 1952 |
| 2,653,090 | Crandall | Sept. 22, 1953 |
| 2,692,219 | Slayter | Oct. 19, 1954 |
| 2,699,389 | Crandall | Jan. 11, 1955 |
| 2,702,241 | Hawley et al. | Feb. 15, 1955 |

FOREIGN PATENTS

| | | |
|---|---|---|
| 497,059 | Great Britain | Dec. 8, 1938 |

UNITED STATES PATENT OFFICE
CERTIFICATE OF CORRECTION

Patent No. 2,859,109                                                      November 4, 1958

Don M. Hawley et al.

It is hereby certified that error appears in the printed specification of the above numbered patent requiring correction and that the said Letters Patent should read as corrected below.

Column 2, line 3, for "completley" read -- completely --; line 62, for "pare" read -- paper --; column 6, line 51, for "tthe" read -- the --; column 8, line 39, Example XV, for "Then" read -- Ten --; column 9, line 8, Example XVI, for "bath 1½ galons of a 10" read --batch 1½ gallons of a 10% --; column 11, line 59, Example XXI, for "mixed" read -- mixer --; column 12, line 12, for "2 of drawings" read -- 2 of the drawings --.

Signed and sealed this 17th day of February 1959.

(SEAL)
Attest:

KARL H. AXLINE                                                ROBERT C. WATSON
Attesting Officer                                            Commissioner of Patents